US012374842B2

(12) United States Patent
Huang et al.

(10) Patent No.: US 12,374,842 B2
(45) Date of Patent: Jul. 29, 2025

(54) ELECTRICAL CONNECTOR WITH PLUG AND SOCKET CAPABILITIES

(71) Applicant: Cheng Uei Precision Industry Co., LTD., New Taipei (TW)

(72) Inventors: Hao-Hao Huang, Dong-Guan (CN); Bin Wang, Dong-Guan (CN); Ting-Feng Liao, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 419 days.

(21) Appl. No.: 17/980,549

(22) Filed: Nov. 3, 2022

(65) Prior Publication Data

US 2023/0283026 A1 Sep. 7, 2023

(30) Foreign Application Priority Data

Mar. 4, 2022 (CN) ......................... 202220471493.7

(51) Int. Cl.

| | |
|---|---|
| ***H01R 24/60*** | (2011.01) |
| ***H01R 13/42*** | (2006.01) |
| ***H01R 13/502*** | (2006.01) |
| ***H01R 13/627*** | (2006.01) |
| ***H01R 13/6581*** | (2011.01) |
| ***H01R 24/84*** | (2011.01) |
| *H01R 107/00* | (2006.01) |

(52) U.S. Cl.

CPC ............ *H01R 24/60* (2013.01); *H01R 13/42* (2013.01); *H01R 13/502* (2013.01); *H01R 13/6272* (2013.01); *H01R 13/6581* (2013.01); *H01R 24/84* (2013.01); *H01R 2107/00* (2013.01)

(58) Field of Classification Search

CPC ...... H01R 24/84; H01R 24/60; H01R 13/502; H01R 13/514; H01R 13/42

USPC ........................................................ 439/358

See application file for complete search history.

(56) References Cited

U.S. PATENT DOCUMENTS

| | | | | |
|---|---|---|---|---|
| 8,323,057 B2 * | 12/2012 | Ho ....................... | H01R 12/725 439/660 |
| 2011/0256764 A1 * | 10/2011 | Wu ...................... | H01R 13/405 439/626 |
| 2011/0293227 A1 * | 12/2011 | Wu ...................... | G02B 6/3817 385/101 |

(Continued)

*Primary Examiner* — Abdullah A Riyami
*Assistant Examiner* — Amara Anderson
(74) *Attorney, Agent, or Firm* — Cheng-Ju Chiang

(57) ABSTRACT

An electrical connector includes an insulating body, a plurality of first terminals and a plurality of second terminals. The insulating body includes a first insulating body, a second insulating body and a third insulating body. A rear end of the first insulating body has an accommodating groove. The first insulating body has a plurality of first terminal grooves. The second insulating body is mounted in the accommodating groove. Several portions of a top surface of the second insulating body are recessed downward to form a plurality of second terminal grooves. The third insulating body is mounted on a lower portion of the rear of the second insulating body. The plurality of the first terminals are mounted in the plurality of the first terminal grooves. The plurality of the second terminals are mounted in the plurality of the second terminal grooves.

11 Claims, 10 Drawing Sheets

(56) References Cited

U.S. PATENT DOCUMENTS

| | | | | |
|---|---|---|---|---|
| 2014/0287624 | A1* | 9/2014 | Lan | H01R 12/724<br>439/607.01 |
| 2015/0079829 | A1* | 3/2015 | Brodsgaard | H01R 24/84<br>439/284 |
| 2023/0058029 | A1* | 2/2023 | Huang | H01R 24/62 |

* cited by examiner

ELECTRICAL CONNECTOR WITH PLUG AND SOCKET CAPABILITIES

CROSS-REFERENCE TO RELATED APPLICATION

The present application is based on, and claims priority from, China Patent Application No. 202220471493.7, filed Mar. 4, 2022, the disclosure of which is hereby incorporated by reference herein in its entirety.

BACKGROUND OF THE INVENTION

1. Field of the Invention

The present invention generally relates to an electrical connector, and more particularly to an electrical connector that is able to be used as a plug and a socket simultaneously.

2. The Related Art

Generally, existing electrical connectors are usually divided into plugs and sockets, and the plug and the socket are connected to each other. However, the electrical connectors which are the plugs and the sockets have different structures, so different molds are needed for manufacturing the plugs and the sockets, and correspondingly, manufacturing costs of the plugs and the sockets are increased. Moreover, the electrical connectors are divided into the plugs and the sockets, when the electrical connectors are maintained, different kinds of the plugs and the sockets need purchasing, and the electrical connectors are replaced by the different kinds of the plugs and the sockets, so costs and working hours of maintaining the electrical connectors are increased. At the same time, a user needs to check the plug and the socket to complete a connection, so the electrical connectors have a usage complexity.

Thus, it is necessary to provide an electrical connector, the electrical connector is able to be used as a plug and a socket simultaneously for reducing a manufacturing cost of the electrical connector. When the electrical connector is maintained, the electrical connector which is used as the plug and the socket is purchased, and the electrical connector which is used as the plug and the socket is still used as a replacement, so costs and working hours of maintaining the electrical connector is decreased. When a user uses the electrical connector for docking, a usage complexity of the electrical connector is reduced.

SUMMARY OF THE INVENTION

An object of the present invention is to provide an electrical connector. The electrical connector includes an insulating body, a plurality of first terminals and a plurality of second terminals. The insulating body includes a first insulating body, a second insulating body and a third insulating body. A front end of the first insulating body has a tongue board, and a rear end of the first insulating body has an accommodating groove. The accommodating groove penetrates through a rear surface and a top surface of the rear end of the first insulating body. The first insulating body has a plurality of first terminal grooves. A front end of each first terminal groove penetrates through a top surface of the tongue board. The second insulating body is mounted in the accommodating groove. Several portions of a top surface of the second insulating body are recessed downward to form a plurality of second terminal grooves penetrating through an upper portion of a rear of the second insulating body. The third insulating body is mounted on a lower portion of the rear of the second insulating body. A lower portion of the third insulating body has a plurality of third terminal grooves. The plurality of the third terminal grooves are disposed corresponding to the plurality of the second terminal grooves. The plurality of the first terminals are mounted in the plurality of the first terminal grooves. Each first terminal has a fastening portion and a first contacting portion. The first contacting portions of the plurality of the first terminals are exposed to the top surface of the tongue board. Each second terminal has a fixing portion. A front end of the fixing portion extends frontward and is arched upward to form a second contacting portion. The fixing portions of the plurality of the second terminals are mounted in the plurality of the third terminal grooves. The second contacting portions of the plurality of the second terminals are mounted in the plurality of the second terminal grooves. The second contacting portions of the plurality of the second terminals are exposed outside of the plurality of the second terminal grooves. The second contacting portions of the plurality of the second terminals are all located above the fastening portions of the plurality of the first terminals.

Another object of the present invention is to provide an electrical connector. The electrical connector includes an insulating body, a plurality of first terminals, a plurality of second terminals and an inner shell. A front end of the insulating body has a tongue board. The plurality of the first terminals are mounted in the insulating body. Each first terminal has a fastening portion and a first contacting portion. The fastening portions of the plurality of the first terminals are mounted in the insulating body. The first contacting portions of the plurality of the first terminals are exposed to a top surface of the tongue board. The plurality of the second terminals are mounted in the insulating body. Each second terminal has a fixing portion. A front end of the fixing portion extends frontward to form a second contacting portion. The fixing portions of the plurality of the second terminals are mounted in the insulating body. The second contacting portions of the plurality of the second terminals are exposed to a middle of a top surface of the insulating body. The second contacting portions of the plurality of the second terminals are all located above the fastening portions of the plurality of the first terminals. The second contacting portions of the plurality of the second terminals are all located behind the first contacting portions of the plurality of the first terminals. The inner shell has an insertion space longitudinally penetrating through a front surface and a rear surface of the inner shell. The inner shell surrounds the insulating body. The tongue board of the insulating body projects out of the inner shell from a front of a lower portion of the insertion space. The first contacting portions of the plurality of the first terminals are exposed outside of the insertion space. The second contacting portions of the plurality of the second terminals are positioned inside the insertion space. When two electrical connectors are connected to each other, the two electrical connectors are placed in two opposite states, the two tongue boards of the two opposite electrical connectors face the two insertion spaces of the two opposite electrical connectors, so that the two tongue boards of the two opposite electrical connectors enter the two insertion spaces of the two opposite electrical connectors mutually, the first contacting portions of the plurality of the first terminals of one electrical connector contact with the second contacting portions of the plurality of the second terminals of the other electrical connector, the first contacting portions of the plurality of the first terminals of the other electrical connector contact with the second contacting portions of the plurality of the second terminals of the one electrical connector.

Another object of the present invention is to provide an electrical connector. The electrical connector includes an insulating body, a plurality of first terminals, a plurality of second terminals, an inner shell, an outer shell and a buckling element. A bottom surface of a front portion of the insulating body is recessed inward to form a buckling groove. The plurality of the first terminals are mounted in the insulating body. Each first terminal has a fastening portion mounted in the insulating body, and a first contacting portion. A rear end of the fastening portion is exposed to a rear portion of the insulating body. The first contacting portion is extended from a front end of the fastening portion and is exposed to a top surface of the front portion of the insulating body. The plurality of the second terminals are mounted in the insulating body. Each second terminal has a fixing portion mounted in the insulating body, and a second contacting portion. A rear end of the fixing portion is exposed to the rear portion of the insulating body. The second contacting portion is extended from a front end of the fixing portion and is exposed to a top surface of a middle portion of the insulating body. The inner shell surrounds the insulating body to define an insertion space between the inner shell and the middle portion of the insulating body. The insertion space penetrates through a front of the inner shell. The front end of the fastening portions and the first contacting portions of the plurality of the first terminals project out of the inner shell from the front of the inner shell. The second contacting portions of the plurality of the second terminals are positioned inside the insertion space. A top wall of the inner shell has a first opening penetrating through the top wall of the inner shell. The outer shell surrounds the insulating body, the plurality of the first terminals, the plurality of the second terminals and the inner shell. A top wall of the outer shell has a second opening and a third opening. The second opening and the third opening penetrate through the top wall of the outer shell. The third opening is in front of the second opening. The third opening is disposed corresponding to the first opening. The buckling element is hinged on the outer shell through the second opening. The buckling element has a main portion. A front end of a bottom surface of the main portion of the buckling element protrudes downward to form a buckling portion. When two electrical connectors are connected to each other, the two electrical connectors are placed in two opposite states, the two front portions of the two insulating bodies of the two opposite electrical connectors enter the two insertion spaces of the two opposite electrical connectors mutually, the first contacting portions of the plurality of the first terminals of one electrical connector contact with the second contacting portions of the plurality of the second terminals of the other electrical connector, the first contacting portions of the plurality of the first terminals of the other electrical connector contact with the second contacting portions of the plurality of the second terminals of the one electrical connector. The two buckling portions of the two buckling elements of two opposite electrical connectors are buckled into the two buckling grooves of the two bottom surfaces of the two front portions of the two insulating bodies through the two third openings and the two first openings of the two opposite electrical connectors, respectively.

As described above, the electrical connector is able to be interconnected with the other electrical connector, the electrical connector is able to be the plug and the socket simultaneously for reducing a manufacturing cost of the electrical connector. When the electrical connector is maintained, the electrical connector which is used as the plug and the socket is purchased, and the electrical connector which is used as the plug and the socket is still used as a replacement, so costs and working hours of maintaining the electrical connector is decreased. When a user uses the electrical connector for docking, a usage complexity of the electrical connector is reduced.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
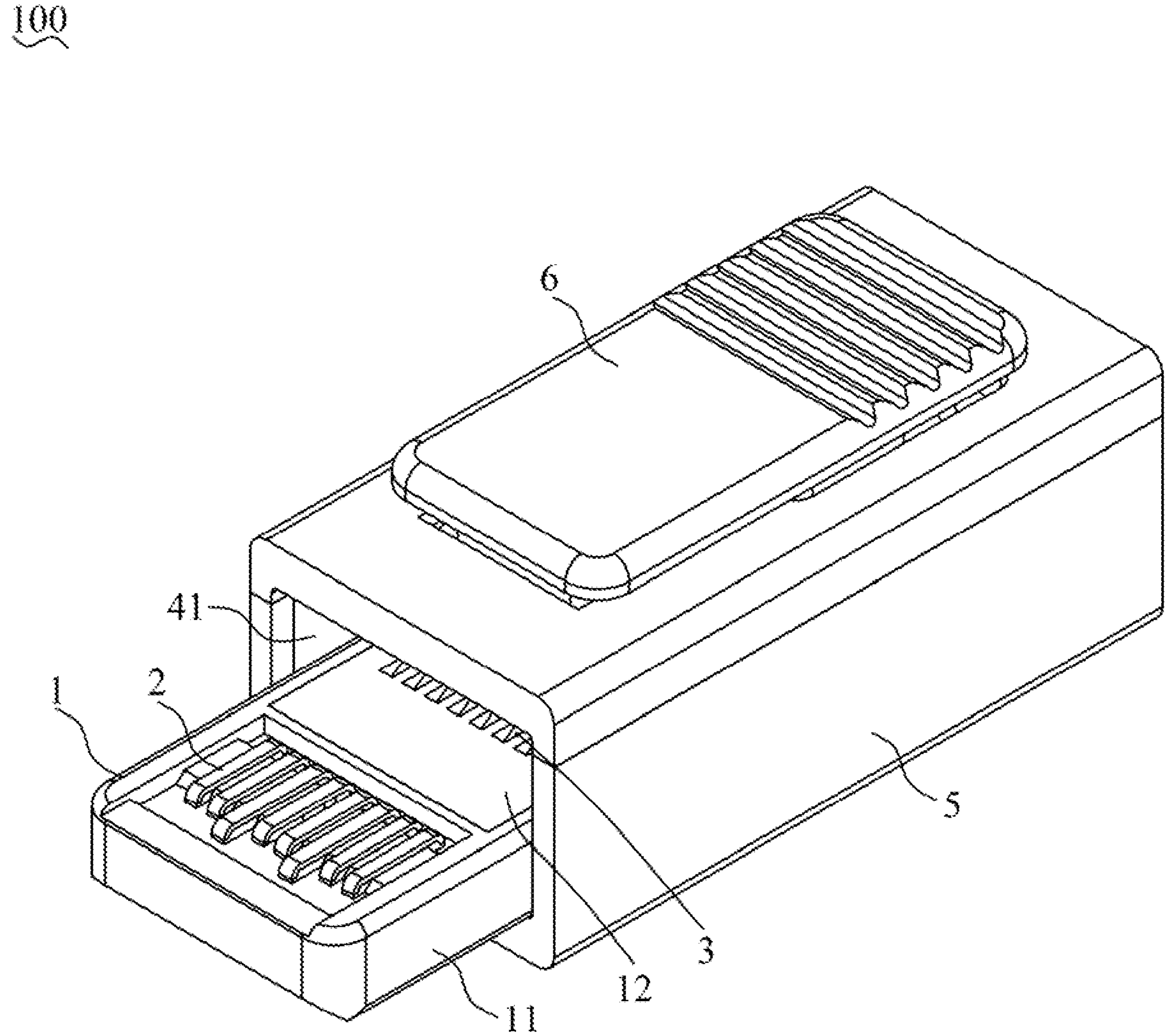
FIG. 1 is a perspective view of an electrical connector in accordance with the present invention.
Figure 2:
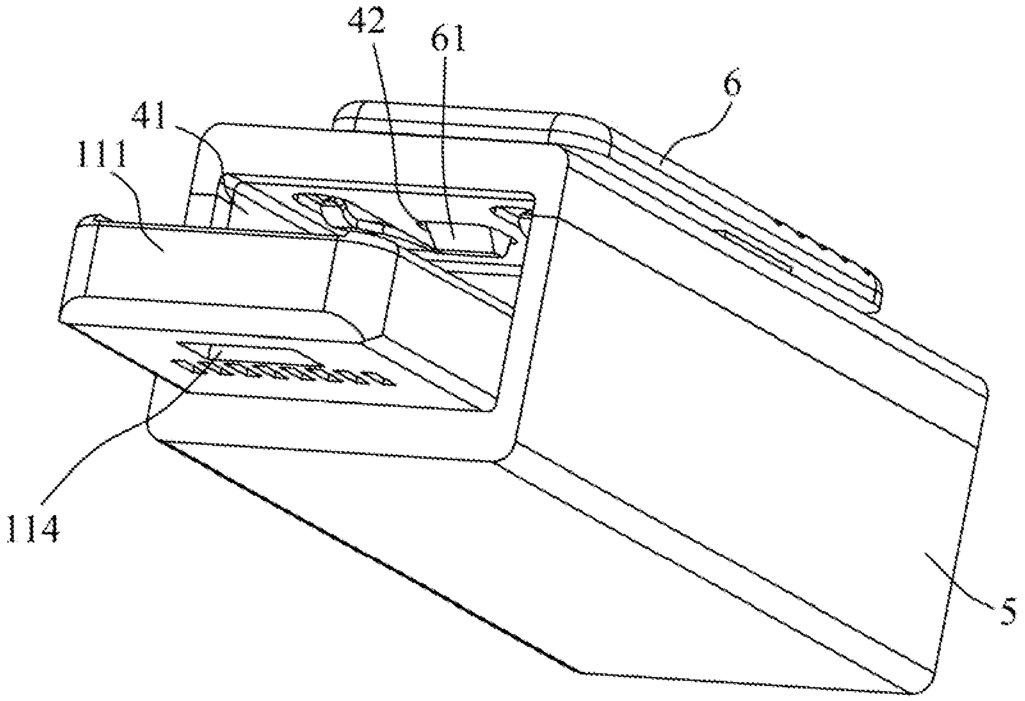
FIG. 2 is another perspective view of the electrical connector in accordance with the present invention.
Figure 3:
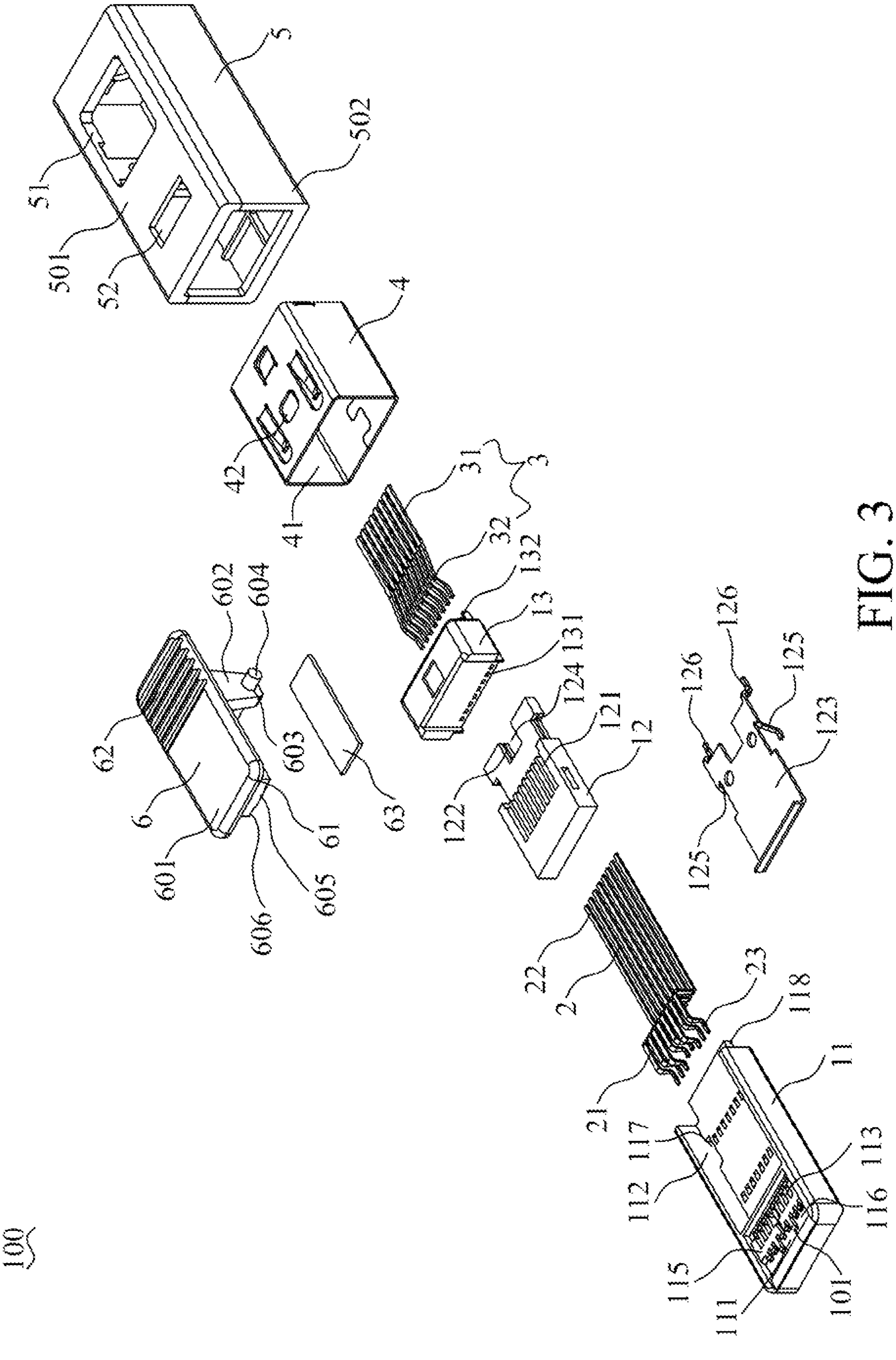
FIG. 3 is an exploded view of the electrical connector in accordance with the present invention.
Figure 4:
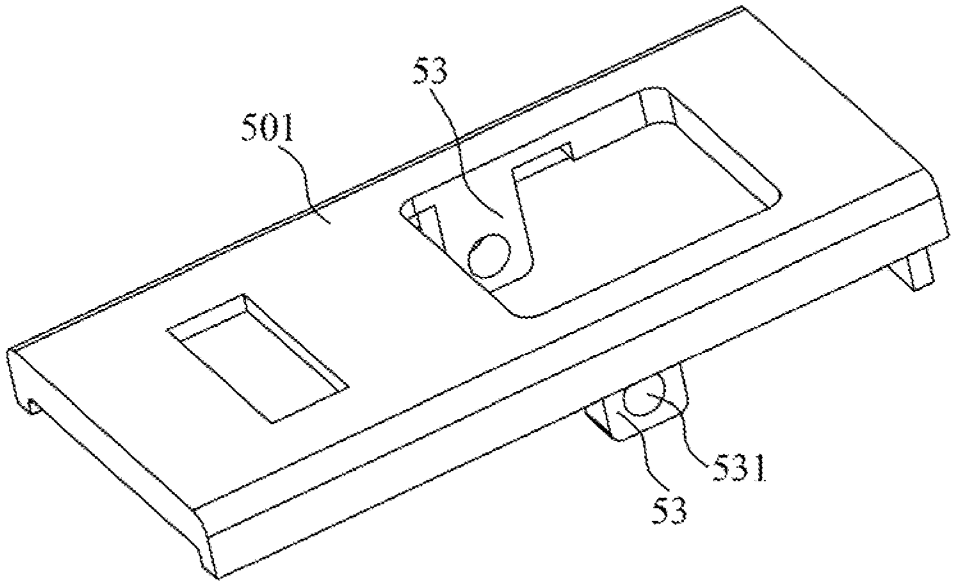
FIG. 4 is a perspective view of an upper shell of an outer shell of the electrical connector in accordance with the present invention.
Figure 5:
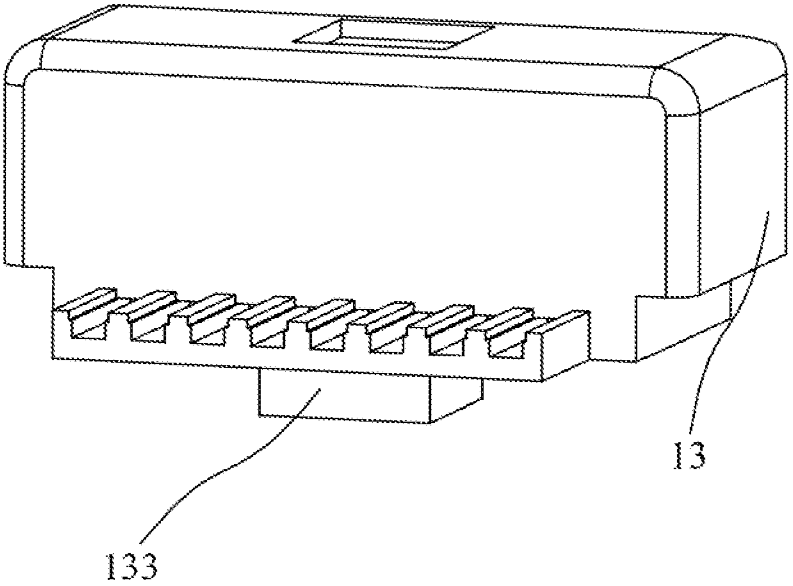
FIG. 5 is a perspective view of a third insulating body of an insulating body of the electrical connector in accordance with the present invention.
Figure 6:
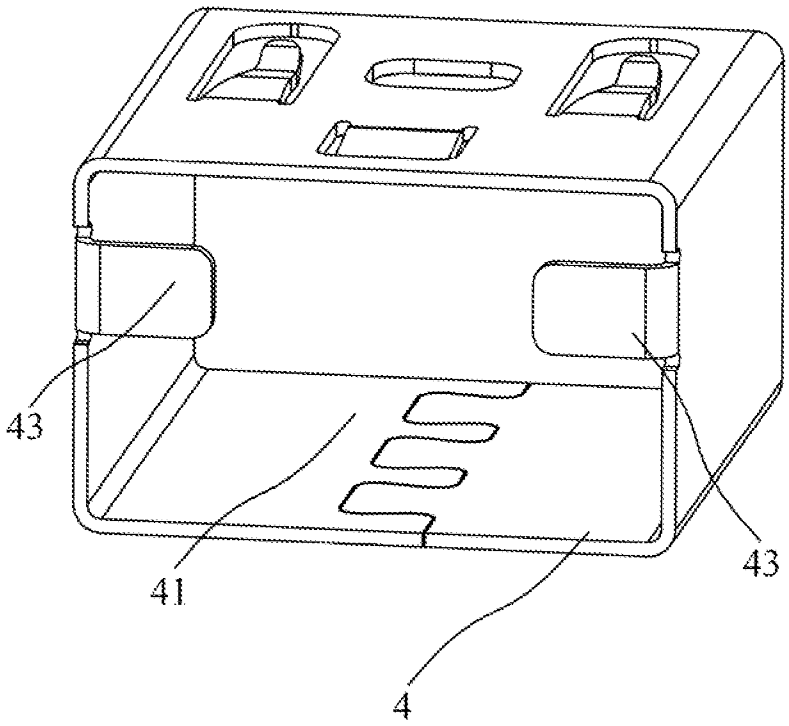
FIG. 6 is a perspective view of an inner shell of the electrical connector in accordance with the present invention.
Figure 7:
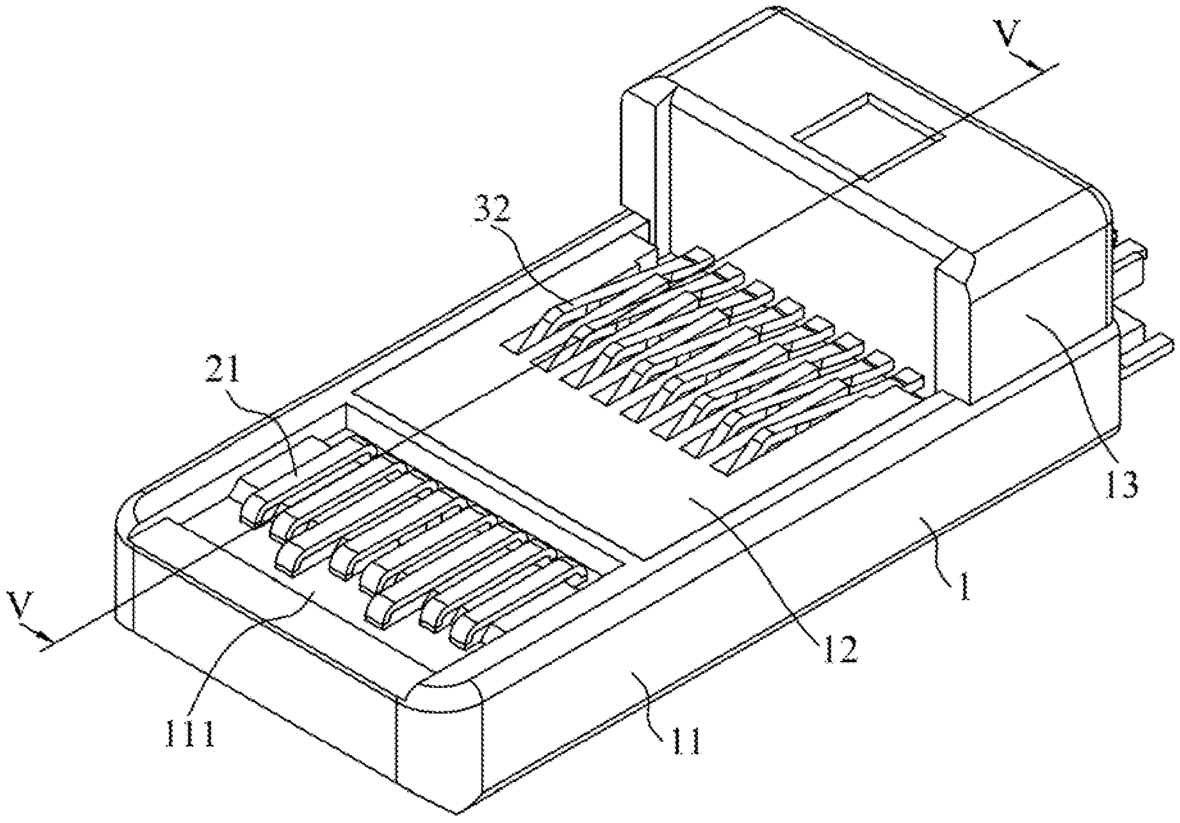
FIG. 7 is a partial assembling view of the electrical connector in accordance with the present invention.
Figure 8:
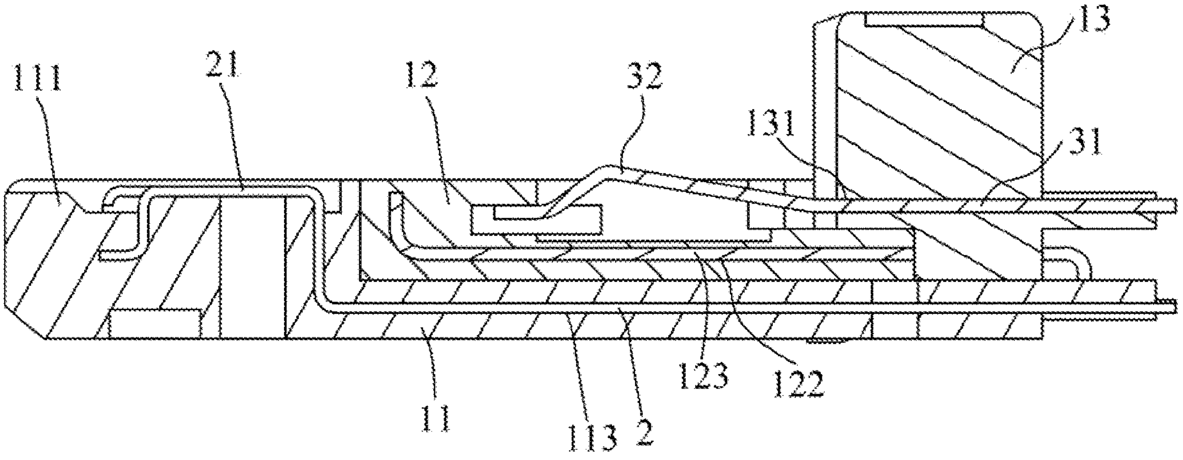
FIG. 8 is a cross-section view of the electrical connector along a line V-V of FIG. 4.
Figure 9:
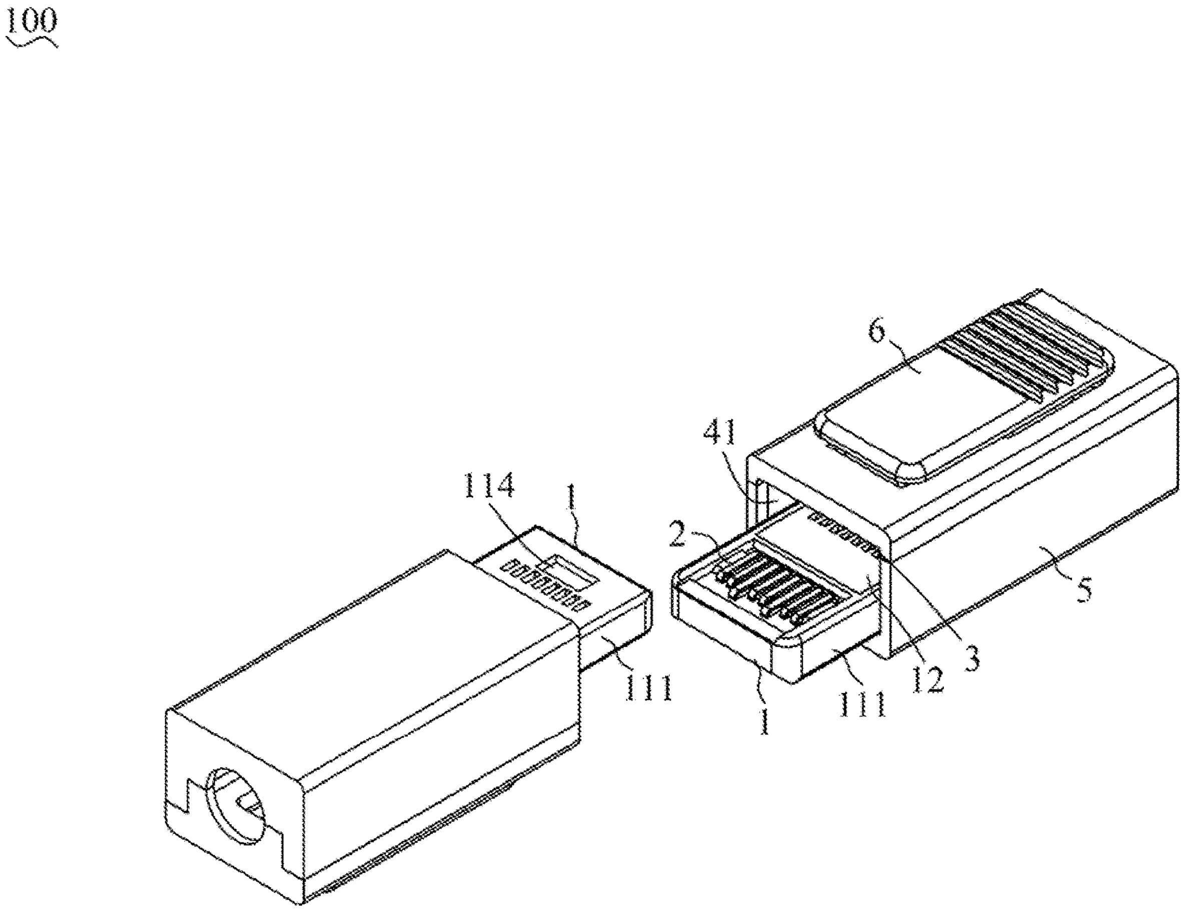
FIG. 9 is a perspective view of two electrical connectors, wherein the two electrical connectors are disassembled.
Figure 10:
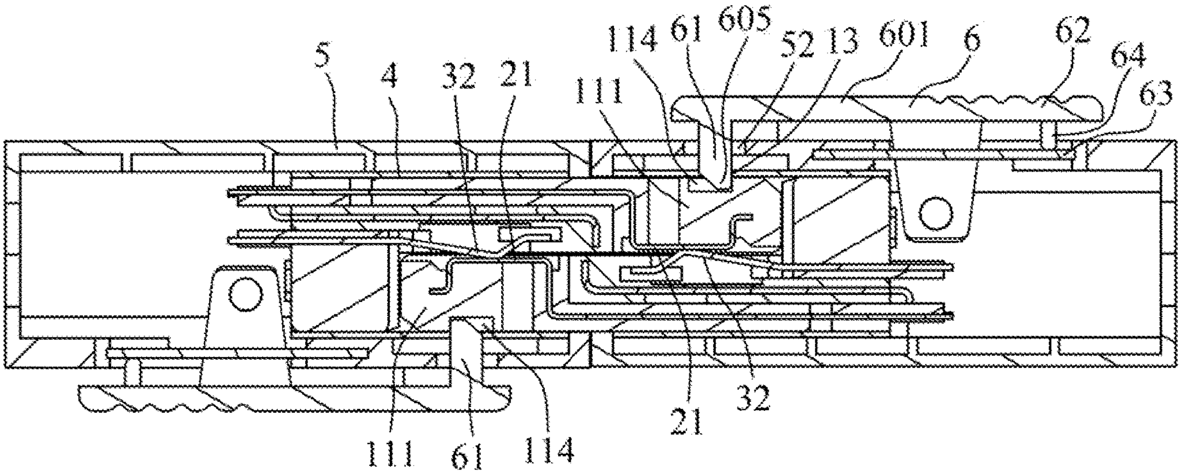
FIG. 10 is a cross-section view of the two electrical connectors, wherein the two electrical connectors are assembled with each other.

With reference to FIG. 1 and FIG. 3, an electrical connector 100 in accordance with the present invention is shown. The electrical connector 100 is able to be a plug and a socket simultaneously. The electrical connector 100 includes an insulating body 1, a shielding element 123, a plurality of first terminals 2, a plurality of second terminals 3, an inner shell 4, an outer shell 5 and a buckling element 6.

With reference to FIG. 1 to FIG. 6, the insulating body 1 includes a first insulating body 11, a second insulating body 12 and a third insulating body 13.

A front end of the insulating body 1 has a tongue board 111. A front end of the first insulating body 11 has the tongue board 111, and a rear end of the first insulating body 11 has an accommodating groove 112. The accommodating groove 112 penetrates through a rear surface and a top surface of the rear end of the first insulating body 11. The first insulating body 11 has a plurality of first terminal grooves 113 formed in the first insulating body 11. A front end of each first terminal groove 113 penetrates through a top surface of the tongue board 111. Several portions of the top surface of the tongue board 111 are recessed inward to form a plurality of locking grooves 101. The plurality of the locking grooves 101 are located in front of the front ends of the plurality of the first terminal grooves 113. Each first terminal groove 113 is aligned with one locking groove 101. A bottom surface of a front portion of the insulating body 1 is recessed inward to form a buckling groove 114. A bottom surface of the tongue board 111 is recessed inward to form the buckling groove 114. The buckling groove 114 is located in front of the plurality of the first terminal grooves 113.

The top surface of the tongue board 111 protrudes upward to form a supporting block 115. The supporting block 115 is located between the plurality of the first terminal grooves 113 and the plurality of the locking grooves 101. The supporting block 115 supports front end portions of the plurality of the first terminals 2. In this case, the top surface of the tongue board 111 is recessed downward to form a concave 116. The supporting block 115 is disposed on a bottom wall of the concave 116. The front ends of the plurality of the first terminal grooves 113 penetrate through the bottom wall of the concave 116. The plurality of the locking grooves 101 penetrate through the bottom wall of the concave 116.

The rear end of the first insulating body 11 further has a pair of lacking grooves 117. The pair of the lacking grooves 117 penetrate a bottom surface of the rear end of the first insulating body 11 and a bottom wall of the accommodating groove 112. The pair of the lacking grooves 117 are formed at two sides of the bottom wall of the accommodating groove 112. A rear surface of the first insulating body 11 extends rearward to form a first extension board 118. The plurality of the first terminal grooves 113 are extended into the first extension board 118. A rear end of each first terminal groove 113 penetrates through a bottom surface and a rear edge of the first extension board 118. Rear ends of the plurality of the first terminals 2 are exposed from the bottom surface and the rear edge of the first extension board 118.

The second insulating body 12 is mounted in the accommodating groove 112. Several portions of a top surface of the second insulating body 12 are recessed downward to form a plurality of second terminal grooves 121 penetrating through an upper portion of a rear of the second insulating body 12. The second insulating body 12 further has a shielding groove 122. The shielding groove 122 penetrates through a middle of a lower portion of the rear of the second insulating body 12. The shielding groove 122 further penetrates two side surfaces and a rear surface of the lower portion of the rear of the second insulating body 12. The rear of the second insulating body 12 has a notch 124. The notch 124 penetrates a top surface, a bottom surface and the rear surface of the lower portion of the rear of the second insulating body 12.

The shielding element 123 is fastened in the shielding groove 122. The shielding element 123 is used for shielding the plurality of the first terminals 2 and the plurality of the second terminals 3 to prevent mutual interferences among the plurality of the first terminals 2 and the plurality of the second terminals 3. The shielding element 123 has a pair of grounding legs 125 exposed from the two side surfaces of the lower portion of the rear of the second insulating body 12. The pair of the grounding legs 125 slantwise extend downward and frontward, and then extend frontward from two sides of the shielding element 123. The pair of the grounding legs 125 pass through the two lacking grooves 117 of the first insulating body 11. The pair of the grounding legs 125 are further exposed from the bottom surface of the rear end of the first insulating body 11. The shielding element 123 has a pair of soldering legs 126 extending rearward, and then bent downward and extending rearward. The pair of the soldering legs 126 are extended from a rear surface of the second insulating body 12. The pair of the soldering legs 126 are positioned at two sides of the first extension board 118 of the first insulating body 11.

The third insulating body 13 is mounted on the lower portion of the rear of the second insulating body 12. The third insulating body 13 is a stair shape. A rear end of the third insulating body 13 is lower than a front end of the third insulating body 13. A lower portion of the third insulating body 13 has a plurality of third terminal grooves 131. The plurality of the third terminal grooves 131 penetrate through a top surface of a rear end of the third insulating body 13, a front surface and a rear surface of the third insulating body 13. The plurality of the third terminal grooves 131 are disposed corresponding to the plurality of the second terminal grooves 121 in a front-to-rear direction. The rear surface of the third insulating body 13 extends rearward to form a second extension board 132. The plurality of the third terminal grooves 131 are extended into the second extension board 132. A rear end of each third terminal groove 131 penetrates through a top surface and a rear edge of the second extension board 132. Rear ends of the plurality of the second terminals 3 are exposed from the top surface and the rear edge of the second extension board 132. A bottom surface of the third insulating body 13 protrudes downward to form a positioning block 133. The positioning block 133 is engaged with the notch 124 of the second insulating body 12. Two side portions of the third insulating body 13 are mounted on two side walls of the accommodating groove 112 of the first insulating body 11.

Referring to FIG. 1 to FIG. 10, the plurality of the first terminals 2 are mounted in the plurality of the first terminal grooves 113 of the insulating body 1. Each first terminal 2 has a fastening portion 22 mounted in the insulating body 1, and a first contacting portion 21. The first contacting portion 21 is extended from a front end of the fastening portion 22 and is exposed to a top surface of the front portion of the insulating body 1. The front end of the fastening portion 22 extends upward, and then meanders frontward to form the first contacting portion 21. A rear end of the fastening portion 22 is exposed to a rear portion of the insulating body 1. A front end of the first contacting portion 21 is bent downward and then extends frontward to form a locking portion 23. The first contacting portions 21 of the plurality of the first terminals 2 are exposed to the top surface of the tongue board 111. The locking portions 23 of the plurality of the first terminals 2 are locked in the plurality of the locking grooves 101. The first contacting portions 21 of the plurality of the first terminals 2 are mounted on the supporting block 115. The fastening portions 22 of the plurality of the first terminals 2 are mounted in the insulating body 1. Rear ends of the fastening portions 22 of the plurality of the first terminals 2 are exposed from the bottom surface and the rear edge of the first extension board 118.

The plurality of the second terminals 3 are mounted in the insulating body 1. Each second terminal 3 has a fixing portion 31 mounted in the insulating body 1. A rear end of the fixing portion 31 is exposed to the rear portion of the insulating body 1. A front end of the fixing portion 31 extends frontward and is arched upward to form a second contacting portion 32. The second contacting portion 32 is extended from the front end of the fixing portion 31 and is exposed to a top surface of a middle portion of the insulating body 1. The fixing portions 31 of the plurality of the second terminals 3 are mounted in the plurality of the third terminal grooves 131 of the insulating body 1. The second contacting portions 32 of the plurality of the second terminals 3 are mounted in the plurality of the second terminal grooves 121. The second contacting portions 32 of the plurality of the second terminals 3 are exposed outside of the plurality of the second terminal grooves 121. The second contacting portions 32 of the plurality of the second terminals 3 are exposed to a middle of a top surface of the insulating body 1. The second contacting portions 32 of the plurality of the second terminals 3 are all located above the fastening portions 22 of the plurality of the first terminals 2. Rear ends of the fixing portions 31 of the plurality of the second terminals 3 are exposed from the top surface and the rear edge of the second extension board 132. The second contacting portions 32 of the plurality of the second terminals 3 are all located behind the first contacting portions 21 of the plurality of the first terminals 2.

The inner shell 4 surrounds the rear end of the first insulating body 11. The second insulating body 12 and the third insulating body 13 are both surrounded in the inner shell 4. The inner shell 4 has an insertion space 41 longitudinally penetrating through a front surface and a rear surface of the inner shell 4. The tongue board 111 of the first insulating body 11 longitudinally passes through the insertion space 41 of the inner shell 4. The tongue board 111 of the first insulating body 11 projects out of the inner shell 4 from a front and a rear of a lower portion of the insertion space 41 of the inner shell 4. The first extension board 118 projects out of the inner shell 4 from the rear of the lower portion of the insertion space 41 of the inner shell 4. A top wall of the inner shell 4 has a first opening 42 vertically penetrating through the top wall of the inner shell 4. A material of the inner shell 4 is metal. The inner shell 4 acts a shielding and supporting function. Rear edges of two side plates of the inner shell 4 are bent inward to form two blocking arms 43. The two blocking arms 43 abut against the rear surface of the third insulating body 13. The inner shell 4 surrounds the insulating body 1 to define an insertion space 41 between the inner shell 4 and the middle portion of the insulating body 1. The tongue board 111 of the insulating body 1 projects out of the inner shell 4 from the front of the lower portion of the insertion space 41. The first contacting portions 21 of the plurality of the first terminals 2 are exposed outside of the insertion space 41. The second contacting portions 32 of the plurality of the second terminals 3 are positioned inside the insertion space 41. The insertion space 41 penetrates through a front of the inner shell 4. The front ends of the fastening portions 22 and the first contacting portions 21 of the plurality of the first terminals 2 projecting out of the inner shell 4 from the front of the inner shell 4. The second contacting portions 32 of the plurality of the second terminals 3 are positioned inside the insertion space 41.

The outer shell 5 surrounds the insulating body 1, the plurality of the first terminals 2, the plurality of the second terminals 3 and the inner shell 4. The outer shell 5 includes an upper shell 501 and a lower shell 502. The upper shell 501 is mounted on the lower shell 502. The tongue board 111 of the insulating body 1 projects out of the outer shell 5. A top wall of the outer shell 5 has a second opening 51 and a third opening 52. The second opening 51 vertically penetrates through the top wall of the outer shell 5. The third opening 52 vertically penetrates through the top wall of the outer shell 5. The third opening 52 is in front of the second opening 51. The third opening 52 is disposed corresponding to the first opening 42 in a top-to-down direction.

An inner surface of the top wall of the outer shell 5 has a pair of hinge plates 53. The pair of the hinge plates 53 are protruded downward from the inner surface of the top wall of the outer shell 5. The pair of the hinge plates 53 are positioned at two lateral sides of the second opening 51. Each hinge plate 53 has a hinge hole 531 penetrating through the hinge plate 53 along a transverse direction. The transverse direction is perpendicular to the front-to-rear direction and the top-to-down direction. The front-to-rear direction is perpendicular to the top-to-down direction.

The buckling element 6 is mounted on a top surface of the top wall of the outer shell 5. The buckling element 6 is hinged on the outer shell 5 through the second opening 51. The buckling element 6 has a main portion 601. The main portion 601 is rectangular. A front end of a bottom surface of the main portion 601 of the buckling element 6 protrudes downward to form a buckling portion 61. A rear end of the bottom surface of the main portion 601 of the buckling element 6 protrudes downward to form an abutting portion 64. The buckling portion 61 passes through the third opening 52. A rear end of a top surface of the main portion 601 of the buckling element 6 is defined as a pressing portion 62. The pressing portion 62 is a wave shape. The electrical connector 100 includes an elastic element 63. The elastic element 63 is disposed under the pressing portion 62 and the abutting portion 64. The buckling portion 61 is located in front of the elastic element 63. The abutting portion 64 abuts against the elastic element 63.

The elastic element 63 is disposed in the second opening 51. The elastic element 63 is extended along the front-to-rear direction. A front end of the elastic element 63 is embedded in a front wall of the second opening 51. Therefore, the elastic element 63 is formed as a cantilever. A middle of the bottom surface of the main portion 601 of the buckling element 6 protrudes downward to form a pair of hinge boards 602. The pair of the hinge boards 602 are positioned at two lateral sides of the bottom surface of the main portion 601 of the buckling element 6. Each hinge board 602 has a hinge opening 603 penetrating through the hinge board 602 along the transverse direction. The two hinge boards 602 are inserted into the second opening 51. Outer surfaces of the hinge boards 602 of the buckling element 6 abut against inner surfaces of the two hinge plates 53 of the outer shell 5. The two hinge openings 603 of the two hinge boards 602 are aligned with the two hinge holes 531 along the transverse direction. A shaft 604 passes through the two hinge openings 603 and the two hinge holes 531. A middle of a free end of the buckling portion 61 further extends downward to form a buckling head 605. A width of the buckling head 605 is smaller than a width of the bucking portion 61. Therefore, a shoulder 606 is formed between the buckling portion 61 and the buckling head 605. The shoulder 606 of the buckling element 6 abuts against the top wall of the inner shell 4. The shoulder 606 of the buckling element 6 abuts against a top surface of a peripheral wall of the first opening 42 of the inner shell 4. The buckling head 605 passes through the first opening 42 and projects into the insertion space 41 of the inner shell 4.

When the user presses the pressing portion 62, a front end of the buckling element 6 is lifted upward due to a lever principle, so that the buckling portion 61 is separated upward from the third opening 52 and the buckling head 605 is separated upward from the buckling groove 114 of a mating connector which is identical to the electrical connector 100. At the same time, a bottom of the pressing portion 62 presses downward on the elastic element 63, so that the elastic element 63 is deformed and the elastic element 63 accumulates an elastic force. When the user releases the pressing portion 62, the elastic element 63 which is pressed by the pressing portion 62 releases the elastic force, and the elastic element 63 returns to an initial state. The pressing portion 62 is pushed upward by the elastic element 63, so that a front end of the elastic element 63 moves downward due to the lever principle, and the buckling portion 61 enters the third opening 52 and the buckling head 605 enters the buckling groove 114 of the mating connector which is identical to the electrical connector 100.

With reference to FIG. 1 to FIG. 10, when the two electrical connectors 100 are connected to each other, the two electrical connectors 100 are placed in two opposite states, the two tongue boards 111 of the two opposite electrical connectors 100 face the two insertion spaces 41 of the two opposite electrical connectors 100, so that the two tongue boards 111 of the two opposite electrical connectors 100 enter the two insertion spaces 41 of the two opposite electrical connectors 100 mutually, specifically, the tongue board 111 of one electrical connector 100 enters the insertion space 41 of the other electrical connector 100. At the same time, the first contacting portions 21 of the plurality of the first terminals 2 of one electrical connector 100 contact with the second contacting portions 32 of the plurality of the second terminals 3 of the other electrical connector 100, and the plurality of the first terminals 2 of the one electrical connector 100 are conductive with the plurality of the second terminals 3 of the other electrical connector 100. The first contacting portions 21 of the plurality of the first terminals 2 of the other electrical connector 100 contact with the second contacting portions 32 of the plurality of the second terminals 3 of the one electrical connector 100, and the plurality of the first terminals 2 of the other electrical connector 100 are conductive with the plurality of the second terminals 3 of the one electrical connector 100.

The two buckling portions 61 of the two buckling elements 6 of the two opposite electrical connectors 100 pass through the two third openings 52 of the two opposite electrical connectors 100, respectively, the two buckling heads 605 of the two buckling elements 6 of the two opposite electrical connectors 100 are buckled into the two buckling grooves 114 of the two bottom surfaces of the two tongue boards 111 of the two insulating bodies 1 through the two first openings 42 of the two opposite electrical connectors 100, respectively, so that the two electrical connectors 100 are fixed with each other, and the two electrical connectors 100 are connected to each other, the plurality of the first terminals 2 of the one electrical connector 100 keep being conductive with the plurality of the second terminals 3 of the other electrical connector 100, and the plurality of the first terminals 2 of the other electrical connector 100 keep being conductive with the plurality of the second terminals 3 of the one electrical connector 100.

When the user wants to disconnect the two electrical connectors 100 in a conductive state, and the pressing portion 62 of each electrical connector 100 is pressed, the two electrical connectors 100 are separated by virtue of disengaging the two buckling heads 605 of the two electrical connectors 100 from the two buckling grooves 114 of the two electrical connectors 100.

As described above, the electrical connector 100 is able to be interconnected with the other electrical connector 100, the electrical connector 100 is able to be the plug and the socket simultaneously for reducing a manufacturing cost of the electrical connector 100. When the electrical connector 100 is maintained, the electrical connector 100 which is used as the plug and the socket is purchased, and the electrical connector 100 which is used as the plug and the socket is still used as a replacement, so costs and working hours of maintaining the electrical connector 100 is decreased. When a user uses the electrical connector 100 for docking, a usage complexity of the electrical connector 100 is reduced.

What is claimed is:

1. An electrical connector with plug and socket capabilities, comprising:

an insulating body including a first insulating body, a second insulating body and a third insulating body, a front end of the first insulating body having a tongue board, and a rear end of the first insulating body having an accommodating groove, the accommodating groove penetrating through a rear surface and a top surface of the rear end of the first insulating body, the first insulating body having a plurality of first terminal grooves, a front end of each first terminal groove penetrating through a top surface of the tongue board, the second insulating body being mounted in the accommodating groove, several portions of a top surface of the second insulating body being recessed downward to form a plurality of second terminal grooves penetrating through an upper portion of a rear of the second insulating body, the third insulating body being mounted on a lower portion of the rear of the second insulating body, a lower portion of the third insulating body having a plurality of third terminal grooves, the plurality of the third terminal grooves being disposed corresponding to the plurality of the second terminal grooves;

a plurality of first terminals mounted in the plurality of the first terminal grooves, each first terminal having a fastening portion and a first contacting portion, the first contacting portions of the plurality of the first terminals being exposed to the top surface of the tongue board; and a plurality of second terminals, each second terminal having a fixing portion, a front end of the fixing portion extending frontward and being arched upward to form a second contacting portion, the fixing portions of the plurality of the second terminals being mounted in the plurality of the third terminal grooves, the second contacting portions of the plurality of the second terminals being mounted in the plurality of the second terminal grooves, the second contacting portions of the plurality of the second terminals being exposed outside of the plurality of the second terminal grooves, the second contacting portions of the plurality of the second terminals being all located above the fastening portions of the plurality of the first terminals.

2. The electrical connector with plug and socket capabilities as claimed in claim 1, further comprising a shielding element, the second insulating body further having a shielding groove, the shielding groove penetrating through a middle of the lower portion of the rear of the second insulating body, the shielding groove further penetrating two side surfaces and a rear surface of the lower portion of the rear of the second insulating body, the shielding element being fastened in the shielding groove.

3. The electrical connector with plug and socket capabilities as claimed in claim 1, further comprising an inner shell, the inner shell surrounding the rear end of the first insulating body, the second insulating body and the third insulating body being both surrounded in the inner shell, the inner shell having an insertion space longitudinally penetrating through a front surface and a rear surface of the inner shell, the tongue board of the first insulating body projecting out of the inner shell from a front of a lower portion of the insertion space.

4. The electrical connector with plug and socket capabilities as claimed in claim 3, further comprising an outer shell, the outer shell surrounding the insulating body, the plurality of the first terminals, the plurality of the second terminals and the inner shell, the tongue board of the insulating body projecting out of the outer shell.

5. The electrical connector with plug and socket capabilities as claimed in claim 4, wherein a top wall of the inner shell has a first opening vertically penetrating through the top wall of the inner shell, a top wall of the outer shell has a second opening and a third opening, the second opening vertically penetrates through the top wall of the outer shell, the third opening vertically penetrates through the top wall of the outer shell, the third opening is in front of the second opening, the third opening is disposed corresponding to the first opening, the electrical connector further includes a buckling element, the buckling element is mounted on a top surface of the top wall of the outer shell, the buckling element is hinged on the outer shell through the second opening, the buckling element has a main portion, a front end of a bottom surface of the main portion of the buckling element protrudes downward to form a buckling portion, the buckling portion passes through the third opening, a rear end of the bottom surface of the main portion of the buckling element protrudes downward to form an abutting portion, a rear end of a top surface of the main portion of the buckling element is defined as a pressing portion, the electrical connector includes an elastic element, the elastic element is disposed under the pressing portion and the abutting portion, the buckling portion is located in front of the elastic element, the abutting portion abuts against the elastic element.

6. The electrical connector with plug and socket capabilities as claimed in claim 5, wherein the pressing portion is a wave shape.

7. The electrical connector with plug and socket capabilities as claimed in claim 5, wherein a bottom surface of the tongue board is recessed inward to form a buckling groove, the buckling groove is located in front of the plurality of the first terminal grooves, the two buckling portions of the two buckling elements of two opposite electrical connectors pass through the two third openings of the two opposite electrical connectors, respectively, so that the two electrical connectors are fixed with each other, and the two electrical connectors are connected to each other.

8. The electrical connector with plug and socket capabilities as claimed in claim 7, wherein when the pressing portion of each electrical connector is pressed, a middle of a free end of the buckling portion further extends downward to form a buckling head, the two electrical connectors are separated by virtue of disengaging the two buckling heads of the two electrical connectors from the two buckling grooves of the two electrical connectors.

9. The electrical connector with plug and socket capabilities as claimed in claim 1, wherein several portions of a top surface of the tongue board are recessed inward to form a plurality of locking grooves, the plurality of the locking grooves are located in front of the front ends of the plurality of the first terminal grooves, each first terminal groove is aligned with one locking groove, a front end of the fastening portion extends upward, and then meanders frontward to form the first contacting portion, a front end of the first contacting portion is bent downward and then extends frontward to form a locking portion, the locking portions of the plurality of the first terminals are locked in the plurality of the locking grooves.

10. An electrical connector with plug and socket capabilities, comprising:

an insulating body, a front end of the insulating body having a tongue board;

a plurality of first terminals mounted in the insulating body, each first terminal having a fastening portion and a first contacting portion, the fastening portions of the plurality of the first terminals being mounted in the insulating body, the first contacting portions of the plurality of the first terminals being exposed to a top surface of the tongue board;

a plurality of second terminals mounted in the insulating body, each second terminal having a fixing portion, a front end of the fixing portion extending frontward to form a second contacting portion, the fixing portions of the plurality of the second terminals being mounted in the insulating body, the second contacting portions of the plurality of the second terminals being exposed to a middle of a top surface of the insulating body, the second contacting portions of the plurality of the second terminals being all located above the fastening portions of the plurality of the first terminals, the second contacting portions of the plurality of the second terminals being all located behind the first contacting portions of the plurality of the first terminals; and an inner shell having an insertion space longitudinally penetrating through a front surface and a rear surface of the inner shell, the inner shell surrounding the insulating body, the tongue board of the insulating body projecting out of the inner shell from a front of a lower portion of the insertion space, the first contacting portions of the plurality of the first terminals being exposed outside of the insertion space, the second contacting portions of the plurality of the second terminals being positioned inside the insertion space;

wherein when two electrical connectors are connected to each other, the two electrical connectors are placed in two opposite states, the two tongue boards of the two opposite electrical connectors face the two insertion spaces of the two opposite electrical connectors, so that the two tongue boards of the two opposite electrical connectors enter the two insertion spaces of the two opposite electrical connectors mutually, the first contacting portions of the plurality of the first terminals of one electrical connector contact with the second contacting portions of the plurality of the second terminals of the other electrical connector, the first contacting portions of the plurality of the first terminals of the other electrical connector contact with the second contacting portions of the plurality of the second terminals of the one electrical connector.

11. An electrical connector with plug and socket capabilities, comprising:

an insulating body, a bottom surface of a front portion of the insulating body being recessed inward to form a buckling groove;

a plurality of first terminals mounted in the insulating body, each first terminal having:

a fastening portion mounted in the insulating body, a rear end of the fastening portion being exposed to a rear portion of the insulating body;

a first contacting portion being extended from a front end of the fastening portion and being exposed to a top surface of the front portion of the insulating body;

a plurality of second terminals mounted in the insulating body, each second terminal having:

a fixing portion mounted in the insulating body, a rear end of the fixing portion being exposed to the rear portion of the insulating body; and a second contacting portion extended from a front end of the fixing portion and being exposed to a top surface of a middle portion of the insulating body;

an inner shell surrounding the insulating body to define an insertion space between the inner shell and the middle portion of the insulating body, the insertion space penetrating through a front of the inner shell, the front end of the fastening portions and the first contacting portions of the plurality of the first terminals projecting out of the inner shell from the front of the inner shell, the second contacting portions of the plurality of the second terminals being positioned inside the insertion space, a top wall of the inner shell having a first opening penetrating through the top wall of the inner shell;

an outer shell surrounding the insulating body, the plurality of the first terminals, the plurality of the second terminals and the inner shell; a top wall of the outer shell having a second opening and a third opening, the second opening and the third opening penetrating through the top wall of the outer shell, the third opening being in front of the second opening, the third opening being disposed corresponding to the first opening; and a buckling element hinged on the outer shell through the second opening, the buckling element having a main portion, a front end of a bottom surface of the main portion of the buckling element protruding downward to form a buckling portion;

wherein when two electrical connectors are connected to each other, the two electrical connectors are placed in two opposite states, the two front portions of the two insulating bodies of the two opposite electrical connectors enter the two insertion spaces of the two opposite electrical connectors mutually, the first contacting portions of the plurality of the first terminals of one electrical connector contact with the second contacting portions of the plurality of the second terminals of the other electrical connector, the first contacting portions of the plurality of the first terminals of the other electrical connector contact with the second contacting portions of the plurality of the second terminals of the one electrical connector; and wherein the two buckling portions of the two buckling elements of two opposite electrical connectors are buckled into the two buckling grooves of the two bottom surfaces of the two front portions of the two insulating bodies through the two third openings and the two first openings of the two opposite electrical connectors, respectively.

* * * * *